United States Patent [19]

Sohn

[11] Patent Number: 4,717,859

[45] Date of Patent: Jan. 5, 1988

[54] POLYCHROMATIC ELECTRO LUMINESCENCE DISPLAY DEVICE

[75] Inventor: Sang H. Sohn, Kumi-si, Rep. of Korea

[73] Assignee: Gold Star Co., Ltd., Seoul, Rep. of Korea

[21] Appl. No.: 808,816

[22] Filed: Dec. 13, 1985

[30] Foreign Application Priority Data

Dec. 14, 1984 [KR] Rep. of Korea ............... 7950/1984

[51] Int. Cl.$^4$ .................. H05B 33/14; H05B 33/26
[52] U.S. Cl. .................... 313/505; 313/507; 313/509
[58] Field of Search ............. 313/503, 505, 506, 509, 313/507

[56] References Cited

U.S. PATENT DOCUMENTS 3,339,075 8/1967 Szepesi ........................ 313/509 X
3,854,070 12/1974 Vlasenko et al. ............. 313/509 X Primary Examiner—Leo H. Boudreau
Assistant Examiner—K. Wieder
Attorney, Agent, or Firm—Birch, Stewart, Kolasch & Birch

[57] ABSTRACT

The present invention relates to an electroluminescent display device with polychromatic emissions which comprises one photo electroluminescent layer containing a composition of $Na_{0.5}Tb_{0.25}Eu_{0.25}WO_4$ which is combined with an existent fluorescent layer, the thickness of which is one-third that of the fluorescent layer.

3 Claims, 4 Drawing Figures

POLYCHROMATIC ELECTRO LUMINESCENCE DISPLAY DEVICE

BACKGROUND OF THE INVENTION

1. Field of the Invention

This invention relates to an EL (Electroluminescence) plane display device, and more particularly to an EL display device wherein photo luminescence layers are formed in the interior of a ZnS/Mn fluorescent layer to display multiple colors.

2. Discussion of Related Art

As shown in FIG. 1, a conventional EL display device is constructed for displaying an image or form of information, by sputtering $In_2O_3$ onto a glass substrate (1) to form transparent electrodes (2) having the shape of stripes formed in rows by photo etching techniques and then sequentially depositing a lower insulation layer (3) of $Si_3N_4$, a fluorescent layer (4) of AnS/Mn and a upper insulation layer (5) of $Si_3N_4$ thereon and, thereafter, forming rear aluminum electrodes (6) having the shape of stripes on the upper insulation layer (5) in rows in a direction perpendicular to that of the first transparent electrodes. An a.c. pulse voltage (7) is applied between the transparent electrodes (2) and rear electrodes (6).

The operational procedure of the EL display device constructed as described above will now be explained with reference to FIG. 3.

If an a.c. pulse voltage (7) is applied between the transparent electrodes (2) and the rear electrodes (6), then an electric field (E) is induced in the interior of the fluorescent layer (4) between the transparent electrodes (2) and the rear electrodes (6) opposed to each other, and thus electrons (e) existing between the boundary surfaces of the upper and lower insulation layers (5) and (3), and the fluorescent layer (4) are accelerated and emitted into the interior of the fluorescent layer (4) by the electric fields, to impact and excite Mn atom within the interior, so that the EL display device luminesces only a yellowish-orange color having a wavelength of 5850 angstroms inherent to Mn.

Therefore, the conventional EL display device has the drawback that it cannot display an image or information as various colors, but only as a monochromatic yellowish-orange color.

SUMMARY OF THE INVENTION

It is an object of the present invention to provide an improved EL display device wherein an image or information may be displayed as a yellowish-orange color with a wavelength of 5850 angstroms and a red color with a wavelength of 6140 angstroms.

According to the present invention, the above object is accomplished by forming photon luminous layers in the shape of stripes, which comprises a composition of $Na_{0.5}Tb_{0.25}Eu_{0.25}WO_4$ which is a photon luminous material, using the chemical vapor deposition (CVD) method, in such a manner that the photon liminous layers or stripes correspond in direction to rear electrodes but spaced alternately or opposite each space between the stripes of the rear electrodes within the fluorescent layer thereon.

BRIEF DESCRIPTION OF THE DRAWINGS

This and other objects and advantages of the present invention will become clear from the following description with reference to the accompanying drawings wherein.

DETAILED DESCRIPTION OF THE INVENTION

Figure 1:
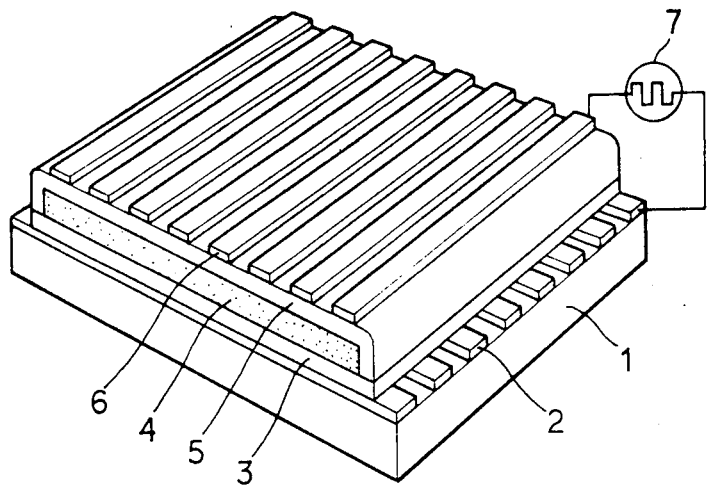
FIG. 1 is the perspective view of conventional EL display device.
Figure 2:
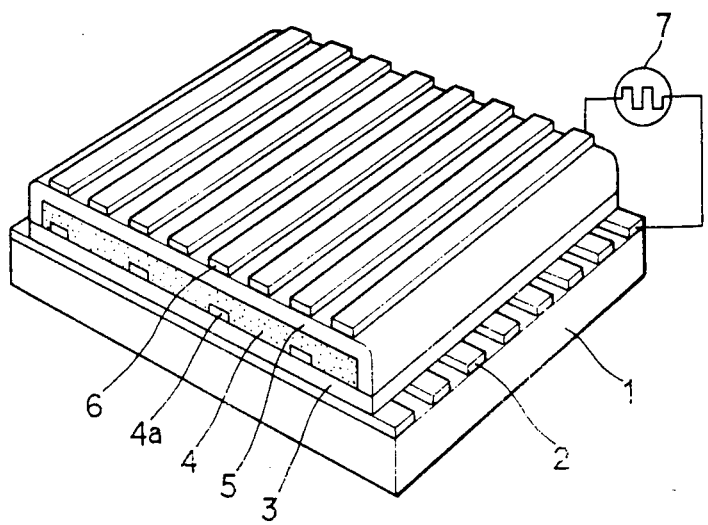
FIG. 2 is the perspective view of an EL display device according to the present invention.
Figure 3:
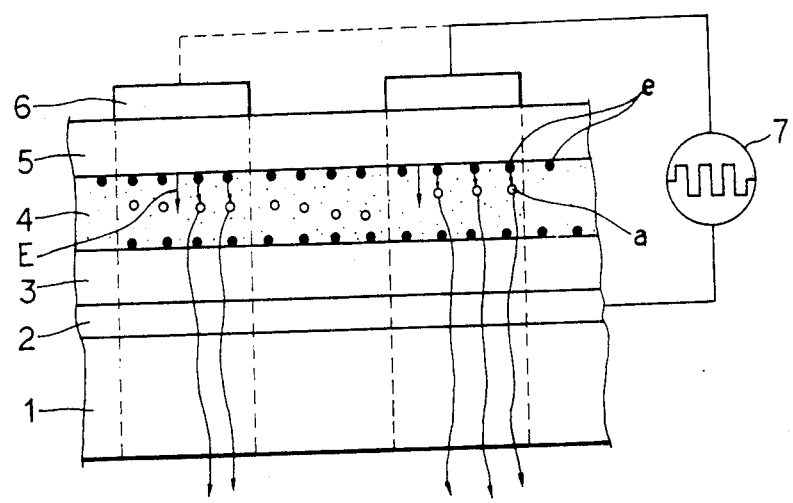
FIG. 3 is the cross-sectional view shown for explaining the state of operation of FIG. 1.

FIG. 2 shows the perspective view of an EL display device according to the present invention. The EL display device in FIG. 2 is constructed by sputtering $In_2O_3$ onto a glass substrate (1) to form the transparent electrodes (2) in the shape of rows of stripes in one direction; and then sequentially depositing a lower insulation layer (3) of $Si_3N_4$, a fluorescent layer (4) of ZnS/Mn and a upper insulation layer (5) of $Si_3N_4$ thereon; and thereafter forming the aluminum rear electrodes (6) in the shape of rows of stripes on the upper insulation layer (5) in a column direction perpendicular to that of the transparent electrodes. Photon luminous layers (4a) in the shape of stripes are provided on the lower insulation layer (3), using the chemical vapor deposition (CVD) method, in such a manner that said photon luminous layers (4a) correspond in direction to the rear electrodes (6) but spaced alternately or opposite each space between the stripes of the rear electrodes having one third the thickness of the fluorescent layer (4) in the fluorescent layer (4).

The deposition of the photon luminous layers (4a) is accomplished by defining rectangular plane surfaces to correspond in direction to the rear electrodes alternately or opposite every other space between the rear electrode stripes, disposed by mask in a manner equal in size to the rear electrodes, on the lower insulation layer (3) the photon luminous material consisting of $Na_{0.5}Tb_{0.25}Eu_{0.25}WO_4$ one third the thickness of the fluorescent layer, and is generally deposited by the chemical vapor deposition (CVD) method.

Figure 4:
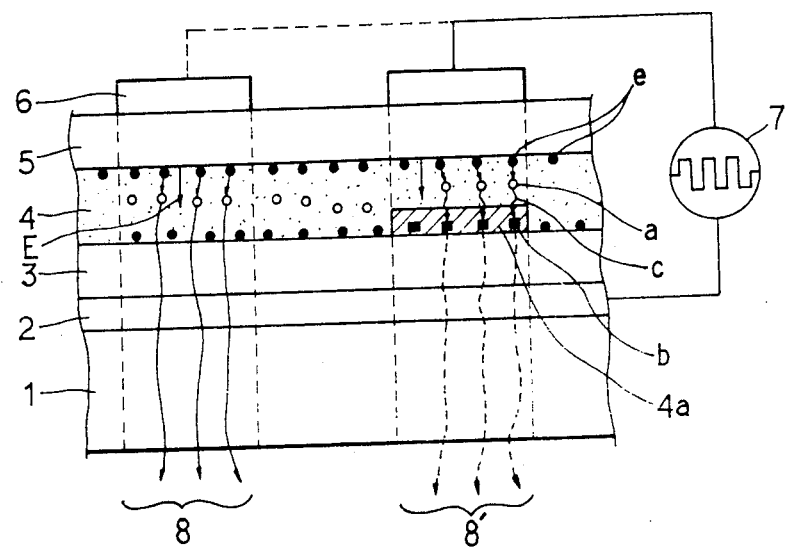
FIG. 4 is the cross-sectional view shown for explaining the state of operation of FIG. 2.

The operational procedure of the present invention constructed as described above will now be explained with reference to FIG. 4.

If an a.c. pulse voltage (7) is applied between the transparent electrodes (2) and the rear electrodes (6) then, as previously described, electric fields (E) are inducted into the interior of fluorescent layer (4) in which the transparent electrodes (2) and the rear electrodes are opposed to each other, and thus electrodes (e) existing between the boundary surfaces of the upper and lower insulation layers (5) and (3) and the fluorescent layer (4) are emitted into the interior of the fluorescent layer (4) to impact and excite the Mn atoms (a) within the interior, so that yellowish-orange color photons (c) having a wavelength of 5850 angstroms are emitted from the fluorescent layer (4) to radiate yellowish-orange beams from the portion (8) of the device. Where the photon luminous layers (4a) are formed, the electrons (e) impact and excite Eu atom (b) within the interior of the photon luminous layers (4a), so that red color beams with a wavelength of 6140 angstroms, inherent to Eu atom (b), are radiated from the portion (8') of the service device.

As described above, the EL display device of the present invention can emit yellowish-orange color beams with a wave-length of 5850 angstroms as well as red color beams with a wavelength of 6140 angstroms, thus providing a diversity in displaying an image or information.

While the described embodiment represents the preferred form of the present invention, it is to be understood that modifications will occur to those skilled in the art without departing from the spirit of the invention. The scope of the invention is therefore to be determined solely by the appended claims.

What is claimed is:

1. An electroluminescence plane display device comprising in combination, sequentially:
   a glass substrate;
   transparent electrodes in the shape of rows of stripes formed in a first direction on said glass substrate;
   a first lower insulation layer overlying said transparent electrodes;
   photon luminous layers in the shape of rows of stripes formed on said first insulation layer in a second direction perpendicular to said first direction of said transparent electrodes;
   a fluorescent layer superimposed over and between said photon luminous layers;
   a second upper insulation layer overlying said fluorescent layer; and
   rear electrodes in the shape of rows of stripes formed in said second direction parallel to said rows of photon luminous layers and perpendicular to said first direction of said rows of transparent electrodes, said rows of photon luminous layers being spaced alternately with respect to said rear electrodes opposite each space which exists between the rows of stripes of said rear electrodes.

2. The electro luminescence display device according to claim 1, wherein said luminous material of photon luminous layers consists of $Na_{0.5}Tb0.25Eu_{0.25}WO_4$.

3. The electroluminescence display device according to claim 1, where the thickness of said photon luminous layers is one third that of said fluoroscent layer.

* * * * *